United States Patent [19]

Lee

[11] 3,945,758

[45] Mar. 23, 1976

[54] COOLING SYSTEM FOR A GAS TURBINE

[75] Inventor: Richard M. Lee, Media, Pa.

[73] Assignee: Westinghouse Electric Corporation, Pittsburgh, Pa.

[22] Filed: Feb. 28, 1974

[21] Appl. No.: 447,180

[52] U.S. Cl. .................. 415/144; 415/115; 415/116
[51] Int. Cl.² F01D 13/02; F01D 25/08; F01D 25/12
[58] Field of Search ........... 415/115, 116, 144, 145, 415/174, 117

[56] References Cited
UNITED STATES PATENTS

| | | | |
|---|---|---|---|
| 2,257,982 | 10/1941 | Seippel | 415/145 |
| 2,963,307 | 12/1960 | Bobo | 415/174 |
| 3,015,937 | 1/1962 | Giliberty | 415/116 |
| 3,034,298 | 5/1962 | White | 60/39.66 |
| 3,275,294 | 9/1966 | Allen et al. | 415/116 |
| 3,295,823 | 1/1967 | Waugh et al. | 415/115 |
| 3,343,806 | 9/1967 | Bobo et al. | 415/174 |
| 3,427,000 | 2/1969 | Scalzo | 415/115 |
| 3,511,577 | 5/1970 | Karstensen | 415/115 |
| 3,535,873 | 10/1970 | Szydlowski | 60/39.66 |
| 3,602,605 | 8/1971 | Lee | 415/175 |
| 3,777,489 | 12/1973 | Johnson | 60/226 R |

FOREIGN PATENTS OR APPLICATIONS

| | | | |
|---|---|---|---|
| 586,710 | 3/1947 | United Kingdom | 415/145 |
| 787,666 | 12/1957 | United Kingdom | 415/115 |
| 766,833 | 1/1957 | United Kingdom | 415/115 |

Primary Examiner—Carlton R. Croyle
Assistant Examiner—L. J. Casaregola
Attorney, Agent, or Firm—F. J. Baehr

[57] ABSTRACT

A system is shown for cooling and sealing gas turbine blade structures and discs. A coolant fluid of a required pressure enters an annular chamber radially outwardly of an annular array of stationary blades. The cooling fluid passes through these stationary blades into an inner annular chamber disposed radially inwardly of the stationary blades. The cooling fluid is permitted to leak out upstream between an upstream seal wall member of the inner annular chamber and a shoulder portion of an upstream rotor disc. The cooling fluid is also permitted to leak out downstream from the inner annular chamber between a downstream seal wall member of the inner annular chamber and a shoulder portion of a downstream rotor disc. The downstream wall member also contains angularly disposed passageways which direct jets of pressurized cooling fluid into ports on the adjacent downstream rotor disc. A portion of both the upstream and downstream wall members is a seal between their respective adjacent rotor discs and the stationary blades. The pressure within the annular chamber and leakage therefrom prevents hot motive fluid contamination therein and the resulting reduction in gas turbine cooling fluid efficiency.

2 Claims, 3 Drawing Figures

«3,945,758»

COOLING SYSTEM FOR A GAS TURBINE

BACKGROUND OF THE INVENTION

1. Field of the Invention

This invention relates generally to elastic fluid turbomachines, and particularly, to a system for cooling and sealing gas turbine stator and rotor blade structures and discs.

2. Description of the Prior Art

This invention as filed is generally related to an earlier filed application by the same inventor and assigned to the same assignee and is U.S. Pat. No. 3,602,605. This application presents a complementary system for cooling and also sealing gas turbine stator blades and rotor discs.

As gas turbines are required to operate with motive or working gases at high temperatures for increased performance, there is a greater demand for higher cooling fluid efficiency and more efficient employment of compressors that supply the cooling fluid as well as the motive fluid.

SUMMARY OF THE INVENTION

Generally, the present invention relates to an elastic fluid turbomachine, and more particularly to a system for preventing the inner shroud and stationary blades in a turbomachine from receiving internally any hot motive fluid which would contaminate the cooling fluid therein, and thereafter reduce the cooling of the downstream rotating rotor discs.

Pressurized cooling fluid enters a discrete annular chamber disposed about an annular array of stationary blades. The pressure in this annular chamber is high enough to permit deliberate leakage of cooling fluid out in its associated stage to prevent hot motive fluid from leaking into the cooling fluid chambers.

The pressurized cooling fluid passes through the stationary blades into an inner annular chamber which comprises the inner shroud. Thereupon the cooling fluid is caused to leak out in an upstream direction from the inner annular chamber between an upstream seal on the inner annular chamber and adjacent shoulder portion of an adjacent upstream rotor disc. This pressure differential between the cooling fluid and the hot motive fluid prevents any hot motive fluid from entering the inner shroud and contaminating the inner portion of the blades and chambers therein. Those inner surfaces of the blades and chambers do not have the corrosion resistance that the outer surfaces have for protection against hot corrosive fluids.

In much the same manner, cooling fluid also escapes out between a downstream seal on the inner annular chamber and a shoulder portion of an adjacent downstream rotor disc. Additionally, a portion of the downstream wall is comprised of angularly directed passageways that jet the pressurized cooling fluid from the inner annular chamber through an opening in a side plate arrangement on an adjacent downstream rotor disc. The angularity of this jetted cooling fluid permits the matching of coolant fluid tangential velocity with the speed of the rotor disc at the coolant fluids point of entry in the rotor disc.

A plurality of radially directed passageways in the downstream wall of the inner shroud permits additional exiting of pressurized coolant fluid into the hot motive fluid flow path.

BRIEF DESCRIPTION OF THE DRAWINGS

The invention, along with the objects and advantages thereof will be best understood from the following detailed description taken in conjunction with the accompanying drawings, in which.

DESCRIPTION OF THE PREFERRED EMBODIMENT

Figure 1:
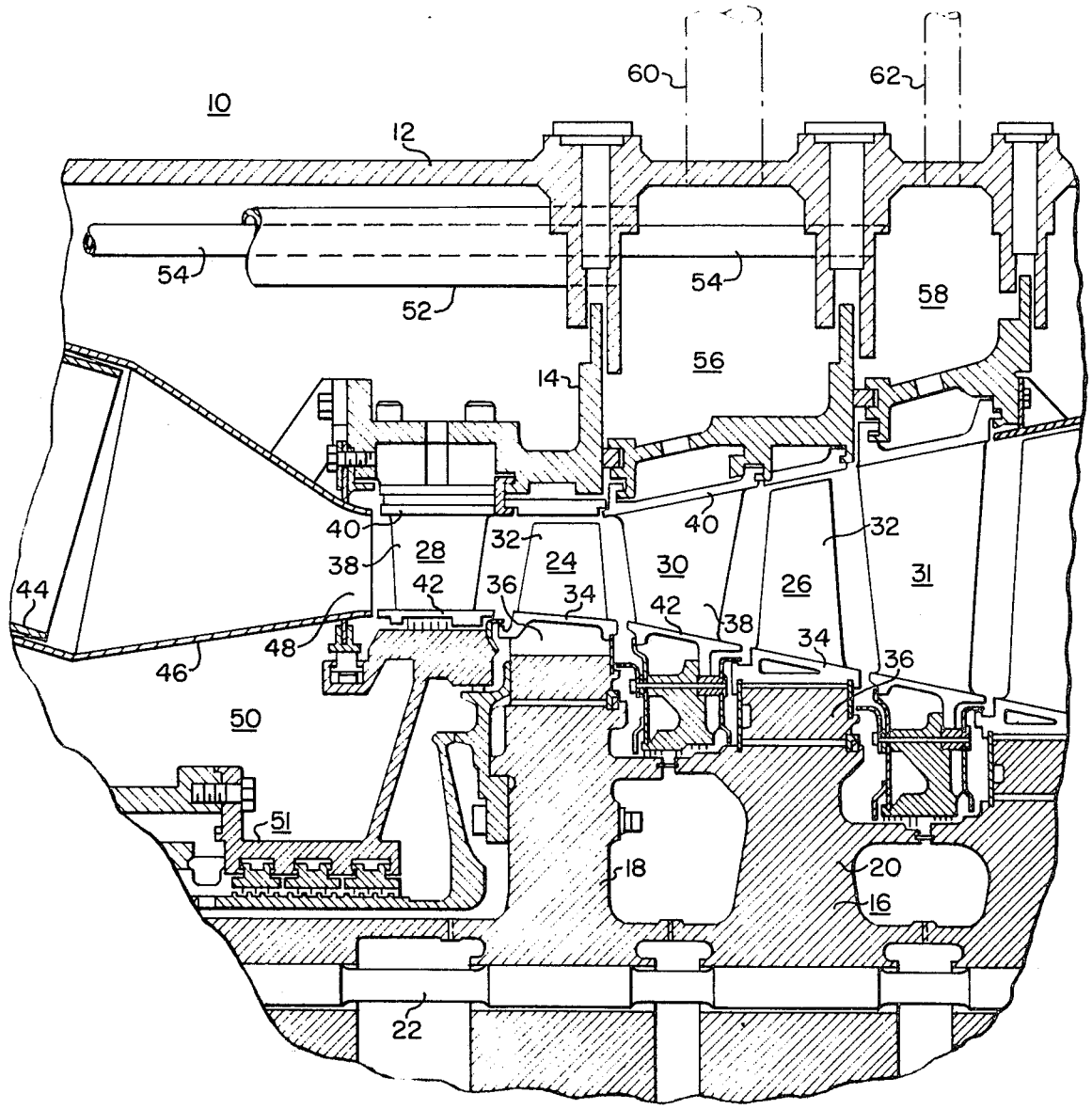
FIG. 1 is a view showing a longitudinal section of a portion of an axial flow gas turbine and compressor having a cooling and sealing system constructed in accordance with the principles of this invention.

Referring to the drawings in detail, and particularly to FIG. 1, there is shown a portion of an elastic fluid turbine 10. Only the upper half and a portion of the lower half of the turbine 10 is shown since the lower half may be identical to the upper half. The turbine 10 comprises an outer casing 12 of generally tubular or annular shape, an inner casing 14 of annular shape encompassed by the outer casing 12, and a rotor structure 16 rotatably supported within the inner casing 14 in any suitable manner, not shown. The rotor structure 16 comprises an aggregate of rotor discs, only the first disc 18 and the second downstream disc 20 being shown, secured together by circumferentially disposed stay bolts 22 extending through the discs 18 and 20, only one stay bolt 22 being shown. The discs 18 and 20, respectively, support a plurality of annular rows of blades 24 and 26 extending radially outwardly therefrom.

Cooperatively associated with the rotor blades 24 and 26 to form stages for motive fluid expansion is an equal number of annular rows of stationary blades 28 and 30, supported within the inner casing 14. An annular array of stationary blades 31 are part of a third stage, shown downstream in FIG. 1.

The rotor blades, 24 and 26, are substantially similar to each other although there is a gradual increase in height in each stage from left to right. The blades, 24 and 26, are of the unshrouded type with a vane portion 32 extending radially outward, a base portion 34, and a root portion 36 suitably secured to the discs 18 and 20.

Similarly, the stationary blades 28 and 30, are substantially similar to each other although gradually increasing in height in each stage from left to right as shown in FIG. 1. Each of the blades 28 and 30 has a vane portion 38 extending radially inward, a base portion 40 and an inner shroud portion 42. The stationary and rotating blades, 28, 30, 24 and 26, generally define the hot motive fluid flow path.

The hot motive fluid, such as pressurized gas, is generated in a plurality of circumferentially disposed combustion chambers 44, only a portion of one being shown. The chambers 44 have corresponding transition members 46, where the downstream ends of the transition members 46 form arcuate outlets 48. Together the outlets 48 form an annular outlet to direct the motive gases to the first blade row 28. The gases flow past the stationary blades 28 and 30 and the rotor blades 24 and 26 from left to right in FIG. 1, with the resulting expansion of the fluid to rotate the rotor structure 16 about its longitudinal axis.

The combustion chambers 44 are disposed in an annular high pressure plenum chamber 50 and pressurized air is directed into the combustion chambers 44 to mix with the fuel, not shown, to form a combustible mixture which is burned to provide the hot motive fluid.

Extending through the high pressure plenum chamber 50 are second and third stage cooling fluid supply conduits 52 and 54. Each conduit receives coolant fluid from an extraction point on a compressor 51, only a portion of which is shown. The second stage cooling fluid supply conduit 52 discharges its pressurized fluid into a second stage outer annular plenum chamber 56. The third stage cooling fluid supply conduit 54 extends through the chamber 56 to discharge its pressurized fluid into a third stage outer annular plenum chamber 58. Each annular plenum chamber receives cooling fluid at a different pressure because the pressure necessary to overcome the possible contamination causing internal surface damage due to hot motive fluid is different at each stage of the turbine. Supplying cooling fluids at several pressures initially, to the outer annular plenum chambers, overcomes the necessity of throttling the cooling fluid passing from one stage to another. This prevents the associated decrease in turbine efficiency due to such throttling.

The cooling fluid may be alternatively supplied by externally disposed conduits 60 and 62, as shown in FIG. 1.

Figure 2:
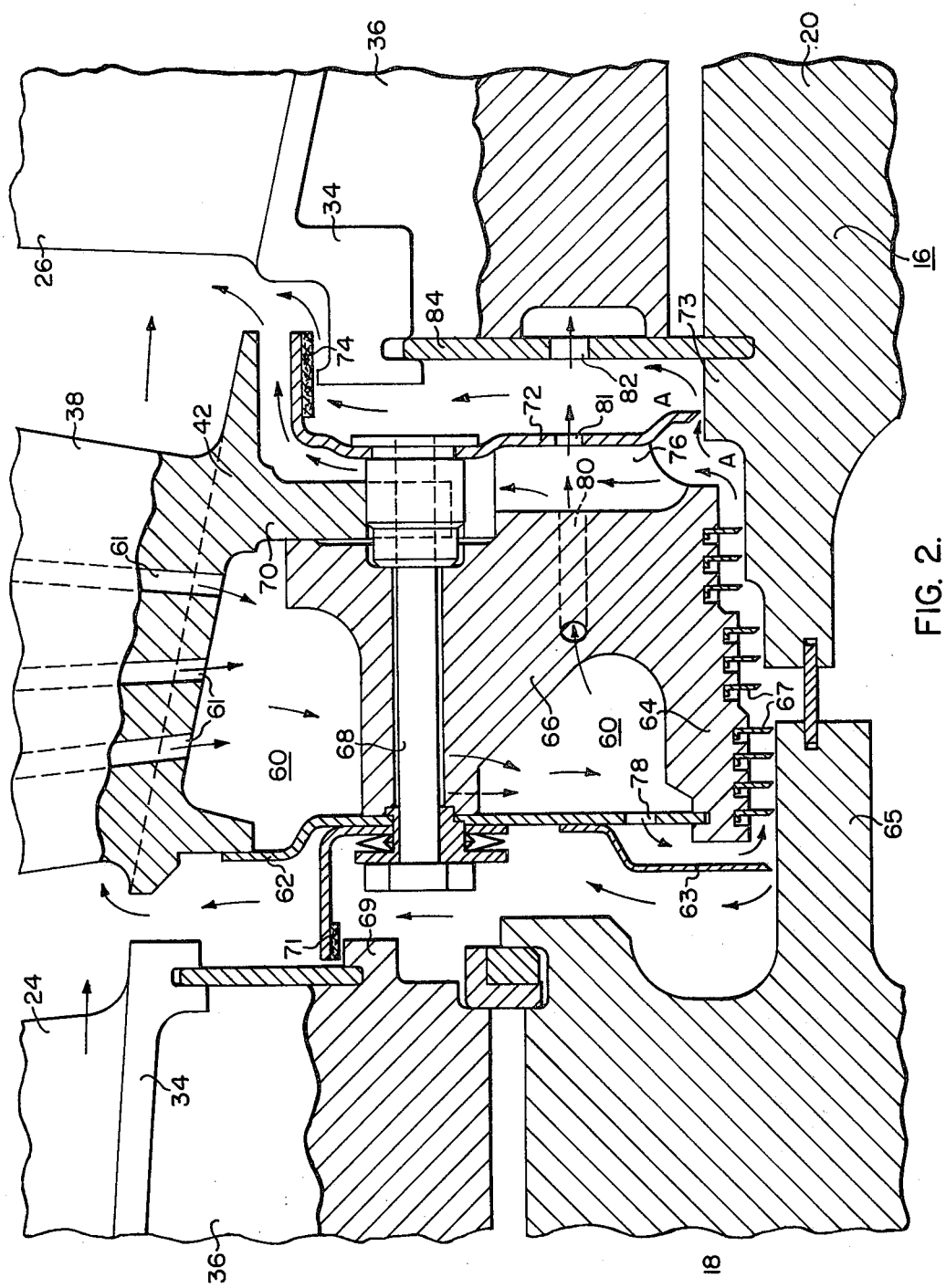
FIG. 2 is an enlarged sectional view showing the cooling and sealing system, as shown in FIG. 1, in detail; and, FIG. 3 shows an alternative embodiment of the cooling system.
Figure 3:
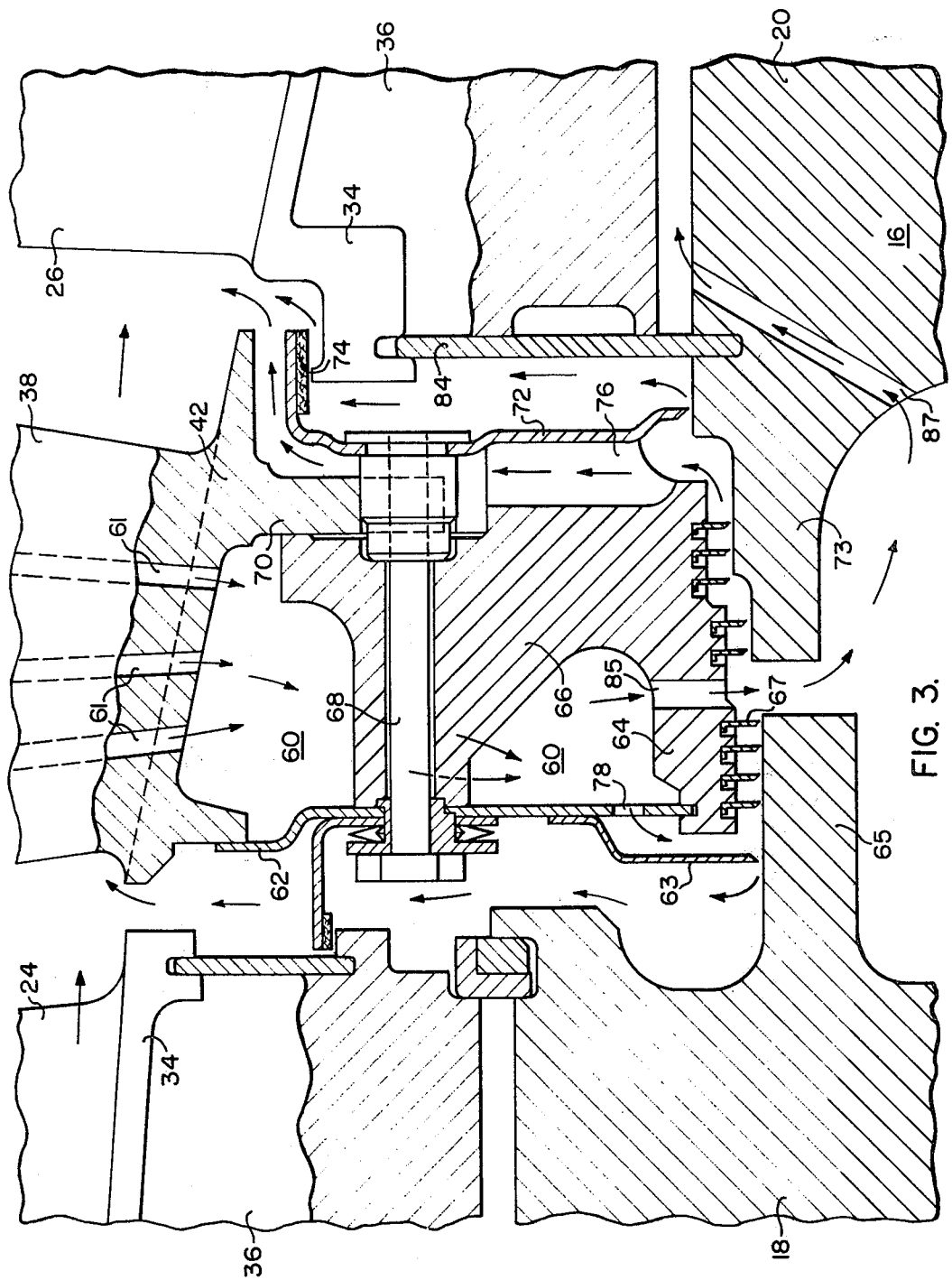

In either case, the pressurized cooling fluid flows through passageways 61, as shown in FIGS. 2 and 3, through by the second stage stationary blades 38, cooling those blades thereby.

The cooling fluid thereupon reaches the radially inner portion of the stationary blades or the inner shroud member 42 shown in FIGS. 2 and 3. The inner shroud member 42 is comprised of an inner generally annular chamber 60. The inner annular chamber 60 is comprised of an arcuately shaped upstream stationary wall member 62, an inner stage arcuate seal member 64, a radially directed web member 66 supporting the inner stage seal member 64, a bolt member 68 securing web member 66 to a radially inwardly directed projection 70 on the inner shroud 42, and an arcuately shaped downstream wall member 72. The downstream wall member 72 also includes an abradable seal member 74 that restricts inward flow of hot gases between the downstream stationary wall 72 and the upstream edge of its neighboring blade root 36. A radially directed channel 76, is disposed on the downstream side of each web member 66. The downstream wall 72 is secured to the downstream end of bolt 68. The pressurized cooling fluid in the inner annular plenum chamber 60 passes through orifices 78 in the upstream wall member 62 and then leaks out upstream between seal member 63, attached to wall member 62 and a shoulder portion 65 of upstream rotor disc 18. An abradable seal 71 is attached to the upstream stationary wall 62 to help restrict the flow of hot gases therepast between the seal 71 and its adjacent shoulder 69 on its respective blade root 36. Since the pressure of the cooling fluid escaping upstream is greater than the pressure of the hot motive fluid at that stage, very little hot motive fluid leaks into and contaminates the inner unprotected surfaces of the cooled inner shroud member 42. A portion of this fluid is permitted to leak downstream radially inwardly of interstage seal member 64 past labyrinthian seal arrangement 67.

Another portion of the cooling fluid passes around the sides of the web member 66 in a manner indicated by the arrows A, in FIG. 2, and leaks downstream between the downstream wall 72 and upstream shoulder portion 73 of the adjacent downstream rotor disc 20. A major portion of the cooling fluid escapes through the radially directed channels or passageways 76 that are located on the downstream side of the web members 66. The abradable seal 74 prevents hot motive fluid from leaking into the upstream side of the rotor disc 20.

A jet of pressurized cooling fluid is sprayed from angularly directed passageways 80 disposed through the support web member 66 and through orifices 81 disposed in downstream wall member 72. The ejected cooling fluid is directed into a port 82 in a sideplate member 84 on the downstream rotor disc 20. The coolant fluid tangential velocity is comparable to the rotor discs' speed at that point of fluid entry, the port 82 in the side plate 84. The matching of coolant fluid tangential velocity and coolant receiving port 82 velocity reduces coolant turbulence and an associated temperature rise and pressure loss that would otherwise occur.

An alternative downstream rotor cooling arrangement shown in FIG. 3, utilizes generally radially directed passageways 85, disposed in the inner stage seal member 64. These passageways 85 permit a portion of the pressurized cooling fluid to flow from the inner annular chamber 60, then between the shoulder portions 65 and 73, of the first and second rotors 18 and 20, in this example, to generally radially directed passageways 87 on the shoulder 73 of the second rotor 20. These passageways 87 direct the cooling fluid to the base and upstream end of the roots 36 of blades 20.

It has been shown that this invention provides individual cooling fluid supply conduits from separate extraction points in a compressor, each extraction point satisfying the pressure requirements for each individual stage cooled in the gas turbine. The manner of extraction optimizes the turbine cycle performance and it avoids the inherent interaction which exists in a cooling system with single sourced parallel circuits. The separate cooling fluid supply to the rotors no longer depend upon seal leakage for cooling of downstream rotor disc members. This permits minimum clearance between seals and rotating members, permitting minimum contamination of unprotected inner surfaces of blades and associated cooling fluid plenum chambers due to hot motive fluid leaking therein. The increased efficiency due to the angularly jetted cooling fluid directly into the downstream ports 82 permits smaller ports for receiving the cooling fluid. This reduces windage losses and entrance losses to the rotor discs. The environment between shroud members 42 and adjacent discs 18 and 20 is controlled due to the pressurized coolant flow escaping therethrough.

Although the invention has been described with a certain degree of particularity, changes may be made therein without departing from the scope and spirit thereof. For example, the upstream and downstream walls of the inner annular chamber could be disposed in a slidable relationship with respect to portions of the inner shroud, or the jetting of the cooling fluid downstream could be accomplished with an alternate array of passageways.

I claim as my invention:

1. An axial flow elastic fluid machine having a multistage compressor and a turbine, said turbine comprising:

a stationary portion and a rotatable portion rotatable about a longitudinal axis;

said rotatable portion including a plurality of discs extending radially outwardly from said axis;

each of said discs having an annular array of radially extendiing blades disposed thereon;

said stationary portion including a plurality of annular arrays of radially extending stationary blades disposed adjacent said arrays of rotatable blades;

said stationary blades having at least one passageway extending generally radially therethrough;

said stationary portion also including a plurality of outer annular plenum chambers disposed radially outwardly of said stationary blades;

said rotating and stationary blades being disposed to provide a flow path for motive elastic fluid;

means for supplying cooling fluid to each of said outer annular plenum chambers from different stages of said compressor at a pressure slightly higher than the motive fluid in the fluid path adjacent the stationary blade;

a plurality of inner annular plenum chambers disposed radially inwardly of said stationary blades;

each of said inner annular plenum chambers being connected in fluid communication with an associated outer plenum chamber by passageways in the stationary blades;

said annular chambers having upstream and downstream passageways disposed to allow the cooling fluid to flow over portions of the upstream and downstream discs to cool them;

said inner annular plenum chambers having a plurality of walls and said walls having a plurality of passageways for directing cooling fluid upon adjacent discs; and said downstream passageways in the inner plenum chamber being angularly disposed and arranged to direct the cooling air obliquely against the adjacent downstream discs;

whereby cooling fluid has a pressure only slightly higher than the motive fluid and is efficiently supplied to cool the stationary blades and adjacent discs.

2. An axial flow elastic fluid machine having a multistage compressor and a turbine, said turbine comprising:

a stationary portion and a rotatable portion rotatable about a longitudinal axis;

said rotatable portion including a plurality of discs extending radially outwardly from said axis;

each of said discs having an annular array of radially extending blades disposed thereon;

said stationary portion including a plurality of annular arrays of radially extending stationary blades disposed adjacent said arrays of rotatable blades;

said stationary blades having at least one passageway extending generally radially therethrough;

said stationary portion also including a plurality of outer annular plenum chambers disposed radially outwardly of said stationary blades;

said rotating and stationary blades being disposed to provide a flow path for motive elastic fluid;

means for supplying cooling fluid to each of said outer annular plenum chambers from different stages of said compressor at a pressure slightly higher than the motive fluid in the fluid path adjacent the stationary blade;

a plurality of inner annular plenum chambers disposed radially inwardly of said stationary blades;

each of said inner annular plenum chambers being connected in fluid communication with an associated outer plenum chamber by passageways in the stationary blades;

said inner annular chambers having upstream and downstream passageways disposed to allow the cooling fluid to flow over portions of the upstream and downstream discs to cool them;

said inner annular plenum chambers having a plurality of walls and said walls having a plurality of passageways for directing cooling fluid upon adjacent discs; and said rotatable blades having root portions and the discs having grooves, which cooperate with the roots of the blades to hold the blades in the discs, there being a space between the radially inner end of the root and the disc and the disc having an angularly disposed passageway arranged to direct cooling fluid into the space between the root and the disc to cool this portion of the disc;

whereby cooling fluid has a pressure only slightly higher than the motive fluid and is efficiently supplied to cool the stationary blades and adjacent discs.

* * * * *